United States Patent [19]

Cardy

[11] Patent Number: 5,144,099
[45] Date of Patent: Sep. 1, 1992

[54] TRIM AND METHOD OF USE

[75] Inventor: Ronald Cardy, London, United Kingdom

[73] Assignee: JanFlow Ltd., Essex, England

[21] Appl. No.: 554,124

[22] Filed: Jul. 17, 1990

[30] Foreign Application Priority Data

Jul. 18, 1989 [GB] United Kingdom ............... 8916369

[51] Int. Cl.⁵ .............................................. H02G 3/14
[52] U.S. Cl. ............................................... 174/66
[58] Field of Search ................ 174/66, 53; 220/241

[56] References Cited

U.S. PATENT DOCUMENTS

| | | | |
|---|---|---|---|
| 2,634,016 | 4/1953 | Hagen | 220/241 |
| 3,636,236 | 1/1972 | Smith | 174/66 |
| 3,684,819 | 8/1972 | Wilson | 174/53 |
| 4,009,797 | 3/1977 | Lee | 220/242 |
| 4,706,426 | 11/1987 | Rumsey | 52/232 |
| 4,918,259 | 4/1990 | Hanson | 174/66 |

FOREIGN PATENT DOCUMENTS

0409600A3 1/1991 European Pat. Off. .

OTHER PUBLICATIONS

European Search Report for EP 90 30 7867, dated Oct. 28, 1991.

*Primary Examiner*—Leo P. Picard
*Assistant Examiner*—David A. Tone
*Attorney, Agent, or Firm*—Woodcock Washburn Kurtz Mackiewicz & Norris

[57] ABSTRACT

A trim for an electrical fitting or the like is provided which is especially adapted for use in relation to a tiled surface. A first trim portion is sandwiched between a fitting faceplate and a recessed wall portion. A second trim portion, connected to the first portion by a third trim portion abuts the tiles. Seals are formed between the trim, the surface and the fitting giving a degree of water resistance.

8 Claims, 2 Drawing Sheets

TRIM AND METHOD OF USE

FIELD OF THE INVENTION

This invention relates to trims and methods of using the same. Preferably, but not exclusively, trims are decorative accessories placed around fittings such as domestic electrical sockets, switch gear and the like accommodated within a cavity in a surface.

BACKGROUND OF THE INVENTION

As is well known the tiling of walls is relatively straightforward until discontinuities such as edges or holes for electrical fittings are reached. In order to accommodate such a discontinuity it is generally necessary to cut pieces from one or more tiles and to shape the cut tiles. The cutting and shaping of tiles is difficult for the unskilled worker and may result in the wastage of many tiles. Even for the skilled artisan tile cutting is time consuming. Very considerable skill is required to neatly to abut tiles to an electrical fitting and gaps which cause accumulation of dirt and moisture generally result.

Frames and fittings of various kinds are known, see, for example, GB 1585760, GB 2032181, GB 2168206, GB 2203996, U.S. Pat. Nos. 4,770,643 and 3,619,476. Prior art fittings do not successfully combine a neat decorative finish with reliable seals especially in the case of cavities in tiled surfaces.

OBJECTS OF THE INVENTION

Accordingly it is a general object of the invention to provide an improved trim.

It is a further object of the invention to provide a trim which is usable on a tiled surface.

It is a still further object of the invention to provide a trim able to provide effective water resistance to the fitting.

These and other objects of the instant invention are achieved by providing in combination a main surface having therein a cavity surrounded by a recessed portion for accommodating a fitting with a faceplate, a trim; and a fitting having a faceplate; said trim having the form of a one-piece component composed of a first continuous wall portion with inner and outer opposed surfaces, the inner surface of the first portion of said trim overlying the cavity and the recessed portion, a second continuous wall portion having inner and outer opposed surfaces, said second continuous portion projecting outwardly from said first continuous portion, said first portion lying inboard said second portion and a third portion connecting said first continuous portion and said second continuous portion; and means for securing the faceplate of the fitting against said trim, said inner surface of said second continuous portion tightly abutting said main surface to establish a substantially continuous area of sealing contact therewith, the inner surface of said first continuous portion of said trim being close to or preferably tightly abutting the recessed portion to establish a substantially continuous area of sealing contact therewith, and said outer surface of said first continuous portion tightly abutting the faceplate to establish a substantially continuous area of sealing contact therewith.

According to the invention there may be provided a main surface having a cavity surrounded by a recessed portion, a trim and a faceplate, the trim comprising a first trim portion having a face lying adjacent and preferably abutting the recessed portion with a substantially unbroken area of contact, a second face of the first trim portion abutting the faceplate with a substantially unbroken area of contact, and a second trim portion having a face abutting the main surface with a substantially unbroken area of contact.

According to another aspect of the invention there is provided a method of mounting a faceplate over a cavity in a main surface surrounded by a recessed portion, the method comprising the steps of applying a trim to a recessed portion of the surface, said trim comprising a first continuous portion with an inner surface for overlying the cavity and the recessed portion, and an outer surface for abutment with the faceplate, a second continuous portion with an inner surface for overlying the main surface and an outer surface, said first portion lying inboard said second portion, a third portion connecting said first continuous portion and said second continuous portion, and means for securing the faceplate against said trim, and securing the faceplate to the surface over the cavity tightly abutting said inner surface of said second continuous portion and establishing a substantially continuous area of sealing contact therewith, preferably tightly abutting said inner surface of said first continuous portion of said trim to the recessed portion and establishing a substantially continuous area of sealing contact therewith and establishing a substantially unbroken area of contact therewith and tightly abutting said outer face of said first continuous portion tightly abutting the faceplate and establishing a substantially continuous area of sealing contact therewith.

The invention still further provides a method of mounting a faceplate over a cavity in a main surface surrounding a recessed portion, the method comprising the steps of applying a trim to the recessed portion of the surface, the trim comprising a first trim portion having a first face for lying adjacent and preferably abutting the recessed portion and a second face for abutting the faceplate and a second trim portion having a face for overlying the main surface, and securing the faceplate to the surface over the cavity such that the first face of the first trim portion lies adjacent or preferably abuts the recessed portion forming a substantially unbroken area of contact, the second face of the first trim portion abuts the faceplate forming a substantially unbroken area of contact, and a face of the second portion abuts the main surface forming a substantially unbroken area of contact.

In some embodiments of the invention the trim is provided with a fourth portion which may be in the form of a lip. The fourth portion abuts the faceplate and forms a further unbroken area of contact and thus may enhance the water resistivity of the arrangement.

The trim is preferably somewhat deformable or resilient and may be made for example of brass, injection moulded PVC and other plastics material. This allows the trim to conform to the surface and/or faceplate Increasing the area of contact and thus may enhance the water resistivity of the arrangement.

The first and second portions are preferably substantially planar spaced apart sheets so as to give a neat appearance.

DESCRIPTION OF PREFERRED EMBODIMENTS INCLUDING BEST MODE CONTEMPLATED

Figure 1:
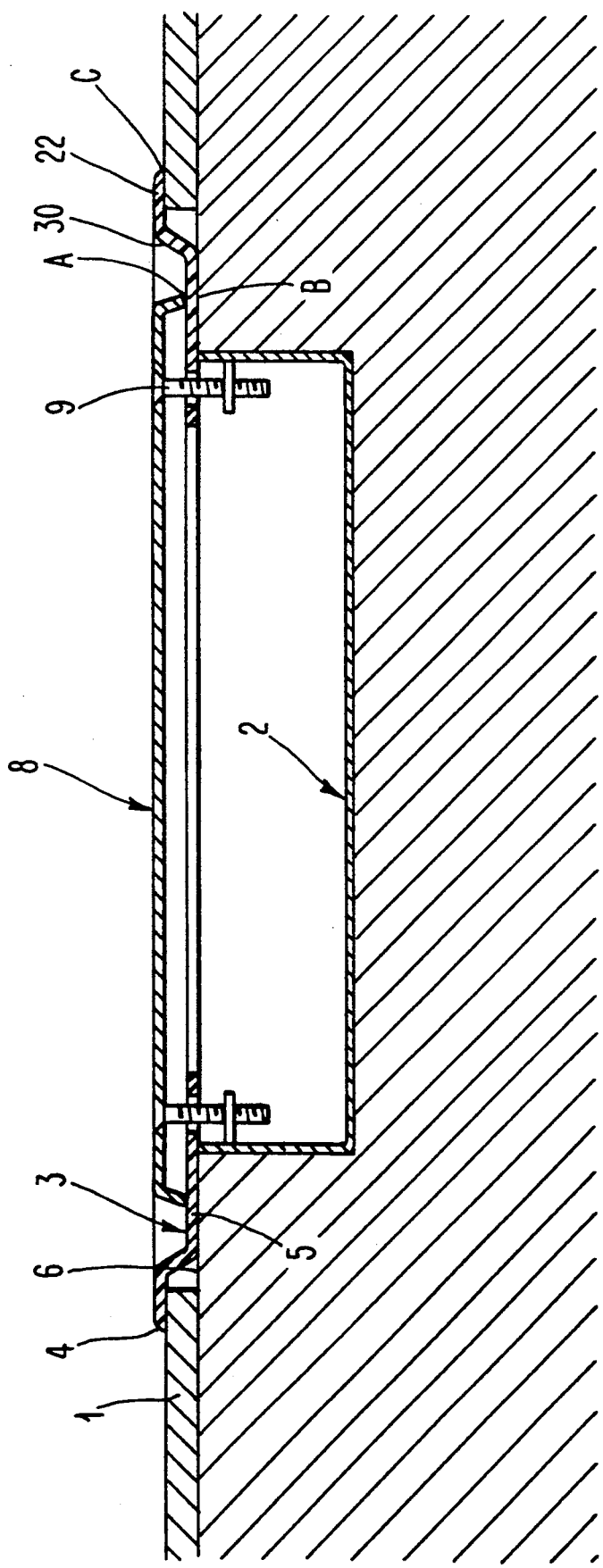
FIG. 1 is a lateral cross-section of a trim according to the invention fitted to a surface.

The accompanying drawings best characterise the invention and in accordance with the method aspect of the invention tiles (1) defining a main decorative surface (20) are laid so as to approach a cavity (2) in which there is a box (2) for a switch (not shown). Cabling (not shown) associated with the switch may be required. Edges of the tiled area approach but do not abut the cavity thereby defining a recessed portion (6). The precise width of the recessed portion is not critical as will be explained hereinafter.

A trim in accordance with the invention is then placed in the recessed portion defined by the tiles. As tiles are of generally similar thickness (4 to 6 mm for wall tiles and 9 to 11 for floor tiles), and cavities for switch boxes are of generally similar dimensions only a limited range of trims will usually be required. It will be appreciated that if the trim is deformable then one type may accommodate a range of tile thicknesses. It will be further appreciated that custom and law in individual states or countries may further restrict the particular range of trims required for the state or country.

The trim is preferably of deformable or resilient material such as PVC or rubber. Relatively plastic metals such as stainless steel, copper or brass may be used. In plan view or front elevation the trim can be generally rectangular or square but other shapes may be chosen to suit the switch box or the outward appearance required.

The trim (3) has a first portion (5) which lies inboard second portion (22). The first and second portions are connected by a third portion (30). In cross-section the trim has a dog-legged appearance as the first and second portions are spaced apart by the third portion.

Figure 2:
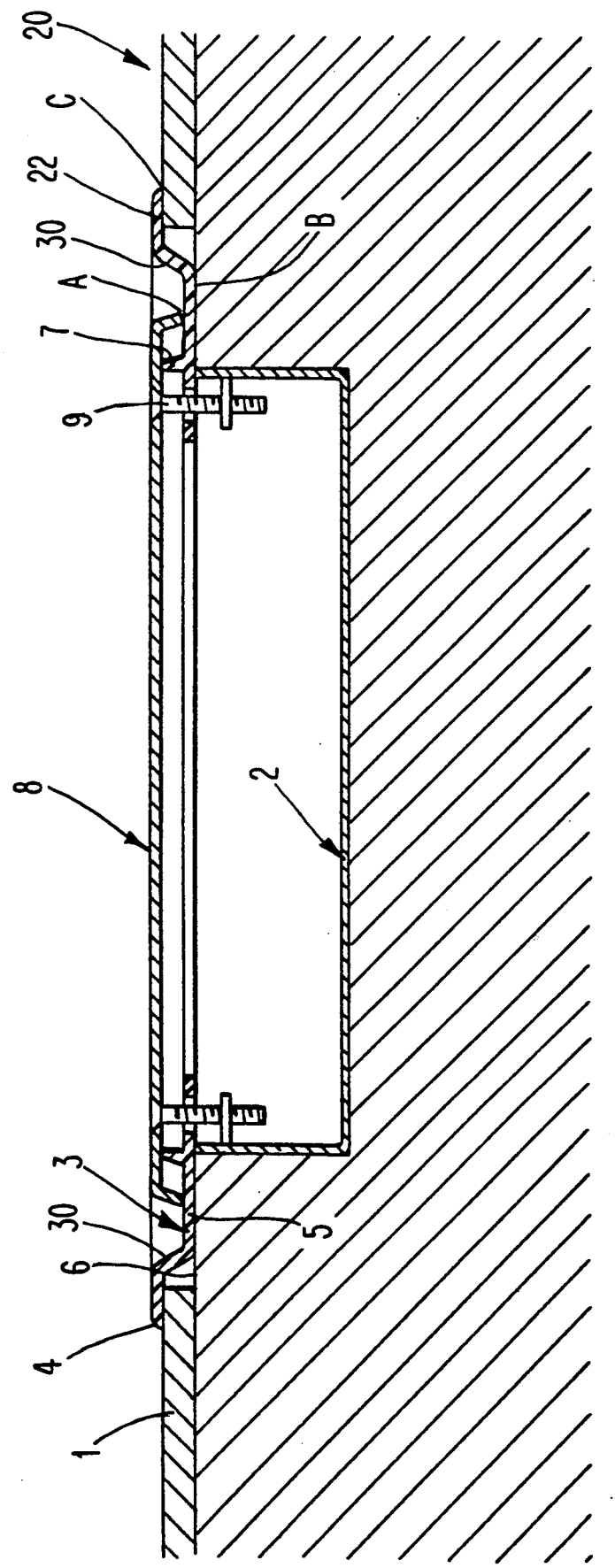
FIG. 2 is a lateral cross-section of a trim according to a further embodiment of the invention.

The extreme outboard edge of the second portion (22) abuts the surface of the tiles and can lie generally parallel with the tiles and/or the first portion. This end may be rounded. The first portion (5) of the trim contacts the untiled recessed portion (6) and may partially extend over the switch box cavity. The extreme inboard edge of the trim is generally provided with mounting means such as lugs for fasteners. In the embodiment of FIG. 2, the inboard edge of the first portion is provided with an upstanding lip (7) which abuts the faceplate (8) forming a further seal.

If desired, the trim may be bedded in on a layer of sealant, such as adhesive, cement or a gasket, for example, of resilient material, especially foamed material, but this is not essential. The faceplate (8) is secured over the switch box (2). Securing means such as machine screws (9) or other threaded fastener can secure the faceplate over the switch box (2). As the screws are tightened a moisture-proof seal is formed between the faceplate and the trim (at point A); between the inner surface of the first portion (5) of the trim and the recessed surface (at point B); and between the inner surface of the second portion (22) of the trim and the tile (at point C). Area rather than point contact may result. Other fasteners such as claws engaging recesses may be used. Similarly by biasing the end (4) of the trim away from its original position by means of tile (1) a liquid tight seal is provided.

The completed assembly may be cleaned with a damp cloth without moisture penetrating the fitting thereby reducing the danger of electric shock during cleaning operations. The assembly may also be readily cleaned thereby reducing the possibility of build up of mold, algae, fungi, bacteria or chemical residues.

If the trim is made of electrically conducting material the securing means should also be of conductive material. This results in the trim being in electrical contact with the switchbox (2) and thus earthed.

Those portions of the trim which are exposed in the completed assembly may be provided with decoration for example by embossing or painting.

Because an edge of the tile (1) is hidden from view under the trim the edge may be roughly cut. The edges need not be a constant distance from the edge of the cavity. It is sufficient that each tile edge is positioned under the trim. In the embodiments shown a significant amount of the first portion is exposed. This allows for easy cleaning but it may be preferred for aesthetic reasons to reduce the size of the exposed portion.

By appropriate selection of the tile, trim and box sizes, it may be possible to effect neat fitting without any tile cutting.

The invention further allows faceplates to be partially or completely recessed relative to the main surface thereby giving a neat appearance and in at least some circumstances, reducing the likelihood of damaging the faceplate in normal use.

Those skilled in the art will be able to device modifications to the invention in both its object and method embodiments.

In particular those skilled will appreciate that the invention is not restricted to tiled surfaces and may be used where a surface is both recessed and provided with a cavity.

What I claim is:

1. In combination:
   a main surface having therein a cavity surrounded by a recessed portion for accommodating a fitting with a faceplate;
   a trim;
   a fitting having a faceplate;
   said trim having the form of a one-piece component composed of:
      a first continuous portion having inner and outer opposed surfaces, the inner surface of said first continuous portion of the trim overlying said cavity and said recessed portion, said inner surface of said first continuous portion tightly abutting said recessed portion thereby establishing a substantially continuous area of sealing contact therewith, said outer surface of said first continuous portion tightly abutting said faceplate thereby establishing a substantially continuous area of sealing contact therewith;
      a second continuous portion having inner and outer opposed surfaces, said second continuous portion projecting outwardly from said first continuous portion, said first continuous portion lying inboard said second continuous portion;
      a third portion connecting said first continuous portion and second continuous portion;
   means for securing said faceplate of the fitting against said trim with said inner surface of said second continuous portion tightly abutting said main surface to establish a substantially continuous area of sealing contact therewith, said means for securing said faceplate overlying said cavity.

2. The combination of claim 1, said trim having a fourth portion, said fourth portion being an outwardly extending lip inboard the substantially continuous area of sealing contact between the faceplate and the outer surface of said first continuous portion, said fourth portion of said trim tightly abutting the faceplate to establish a substantially continuous area of sealing contact therewith.

3. The combination of claim 1, wherein the trim is deformable.

4. The combination of claim 3, wherein the trim comprises injection moulded plastics material.

5. The combination of claim 3, wherein the trim comprises brass.

6. The combination of claim 1, wherein said first continuous portion and said second continuous portion are substantially planar spaced apart sheets.

7. The combination of claim 6, wherein the said first continuous portion of said trim and said second continuous portion of said trim are spaced apart by about 4 to 11 mm (5/32 to 7/16").

8. A method of mounting a faceplate over a cavity in a main surface surrounded by a recessed portion, the method comprising the steps of applying a trim to a recessed portion of the surface, said trim comprising:

a) a first continuous portion with an inner surface for overlying the cavity and the recessed portion, and an outer surface for abutment with the faceplate;

b) a second continuous portion with an inner surface for overlying the main surface, and an outer surface, said first continuous portion lying inboard said second continuous portion;

c) a third portion connecting said first continuous portion and said second continuous portion, and said method further comprising the steps of:

securing the faceplate to the main surface surrounding said recessed portion over the cavity;

thightly abutting said inner surface of said second continuous portion to said main surface thereby establishing a substantially continuous area of sealing contact between said main surface and said inner surface of said second continuous portion;

tightly abutting said inner surface of said first continuous portion of said trim to the recessed portion thereby establishing a substantially continuous area of sealing contact between said inner surface and the recessed portion and further establishing a substantially unbroken area of contact therewith, and tightly abutting said outer face of said first continuous portion to the faceplate thereby establishing a substantially continuous area of sealing contact therewith.

* * * * *

UNITED STATES PATENT AND TRADEMARK OFFICE
CERTIFICATE OF CORRECTION

PATENT NO.   :   5,144,099
DATED        :   September 1, 1992
INVENTOR(S)  :   Ronald Cardy It is certified that error appears in the above-identified patent and that said Letters Patent is hereby corrected as shown below:

In column 1, line 12, after "tiling of walls" insert --and floors--.

Signed and Sealed this

Fifth Day of October, 1993

Attest:

BRUCE LEHMAN

Attesting Officer     *Commissioner of Patents and Trademarks*